(12) United States Patent
Sunohara

(10) Patent No.: US 10,264,149 B2
(45) Date of Patent: Apr. 16, 2019

(54) INFORMATION PROCESSING DEVICE AND IMAGE FORMING APPARATUS

(71) Applicant: Oki Data Corporation, Tokyo (JP)

(72) Inventor: Takahiro Sunohara, Tokyo (JP)

(73) Assignee: Oki Data Corporation, Tokyo (JP)

( * ) Notice: Subject to any disclaimer, the term of this patent is extended or adjusted under 35 U.S.C. 154(b) by 0 days.

(21) Appl. No.: 14/804,887

(22) Filed: Jul. 21, 2015

(65) Prior Publication Data

US 2016/0094740 A1    Mar. 31, 2016

(30) Foreign Application Priority Data

Sep. 26, 2014  (JP) ................................. 2014-196104

(51) Int. Cl.
*H04N 1/00*    (2006.01)
*H04N 1/44*    (2006.01)

(52) U.S. Cl.
CPC ..... *H04N 1/00541* (2013.01); *H04N 1/00328* (2013.01); *H04N 1/00551* (2013.01); *H04N 1/00557* (2013.01); *H04N 1/00559* (2013.01); *H04N 1/4426* (2013.01)

(58) Field of Classification Search
CPC ........... H04N 1/00541; H04N 1/00328; H04N 1/4426; H04N 1/00559; H04N 1/00551; H04N 1/00557
USPC ...................................................... 358/1.14
See application file for complete search history.

(56) References Cited

U.S. PATENT DOCUMENTS

| 5,162,845 A * | 11/1992 | Ariyama ................ G03G 15/00 271/303 |
| 8,218,184 B2 * | 7/2012 | Imaoka .............. H04N 1/00204 340/10.6 |
| 2005/0180764 A1 * | 8/2005 | Koike ................ G03G 21/1882 399/12 |
| 2009/0037981 A1 * | 2/2009 | Kino ..................... G06F 21/608 726/2 |
| 2011/0069348 A1 * | 3/2011 | Yoshitake ............. G06F 3/1211 358/1.15 |
| 2011/0102841 A1 * | 5/2011 | Morita ............... H04N 1/00244 358/1.15 |
| 2013/0169989 A1 * | 7/2013 | Oki ........................... G06F 3/12 358/1.14 |

(Continued)

FOREIGN PATENT DOCUMENTS

| JP | 2006119474 A | 5/2006 |
| JP | 2012-169769 A | 9/2012 |

(Continued)

*Primary Examiner* — Neil R McLean
*Assistant Examiner* — Darryl V Dottin
(74) *Attorney, Agent, or Firm* — Muncy, Geissler, Olds & Lowe, P.C.

(57) ABSTRACT

An information processing device includes a first unit that is a base of the information processing device, a second unit that is disposed above the first unit and rotates around a first rotation shaft which is horizontally arranged, an input part that accepts an operation input by a user, and a wireless reading unit containing part that is disposed next to the input part and contains a wireless reading unit. The wireless reading unit containing part is provided with a containing part to contain the wireless reading unit, and an open/close lid that opens and closes the containing part.

42 Claims, 8 Drawing Sheets

(56) References Cited

U.S. PATENT DOCUMENTS

2014/0327926 A1* 11/2014 Katsuyama ........ H04N 1/00278
358/1.14

FOREIGN PATENT DOCUMENTS

| JP | 2012210801 A | 11/2012 |
|---|---|---|
| JP | 2013030043 A | 2/2013 |

* cited by examiner

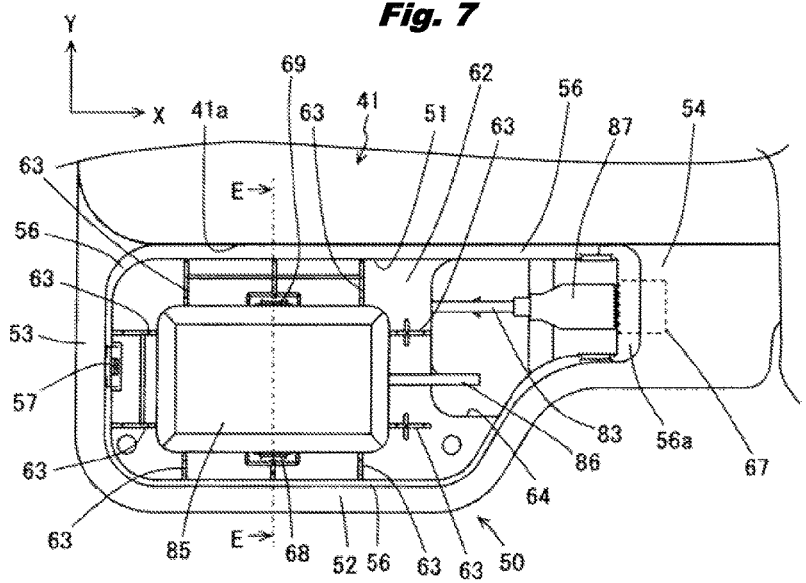
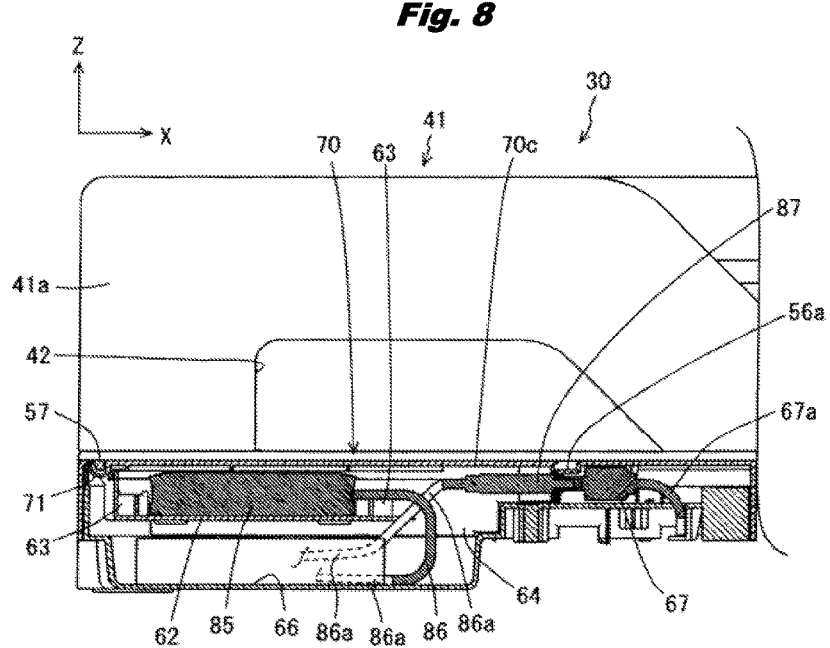

INFORMATION PROCESSING DEVICE AND IMAGE FORMING APPARATUS

CROSS REFERENCE

The present application is related to, claims priority from and incorporates by reference Japanese Patent Application No. 2014-196104, filed on Sep. 26, 2014.

TECHNICAL FIELD

This invention relates to an information processing device, specifically an information processing device provided with a rotatable unit and an authentication function.

BACKGROUND

For example, there was an image forming apparatus provided with a printer main body, a scanner part which is above the printer main body and rotatably held by the printer main body, and an operation panel for operating the apparatus (e.g., see Patent Document 1).

[Patent Document 1] Japanese Unexamined Patent Application 2012-169769 (Page 4, FIG. 2)

In such an image forming apparatus, when it is newly provided with an IC card reader, there were concerns that the installation space of the apparatus would increase and further the external appearance (ornamental appearance) of the apparatus would be damaged.

An information processing device disclosed in the application includes a first unit that is a base of the information processing device, a second unit that is disposed above the first unit and rotates around a first rotation shaft which is horizontally arranged, an input part that accepts an operation input by a user, and a wireless reading unit containing part that is disposed next to the input part and contains a wireless reading unit. The wireless reading unit containing part is provided with a containing part to contain the wireless reading unit, and an open/close lid that opens and closes the containing part.

According to this invention, it becomes possible to contain a wireless reading unit without increasing the installation space of the apparatus or damaging the external appearance of the apparatus.

BRIEF DESCRIPTION OF DRAWINGS

FIG. 7 is a plan view of an IC card reader containing part with an open/close lid off in Embodiment 1.

FIG. 8 is the D-D cross-sectional view of an IC card reader containing part shown in FIG. 5.

FIG. 10A shows a state with the open/close lid closed, and FIG. 10B a state that the open/close lid is open.

DETAILED EMBODIMENTS

Embodiment 1

Figure 1:
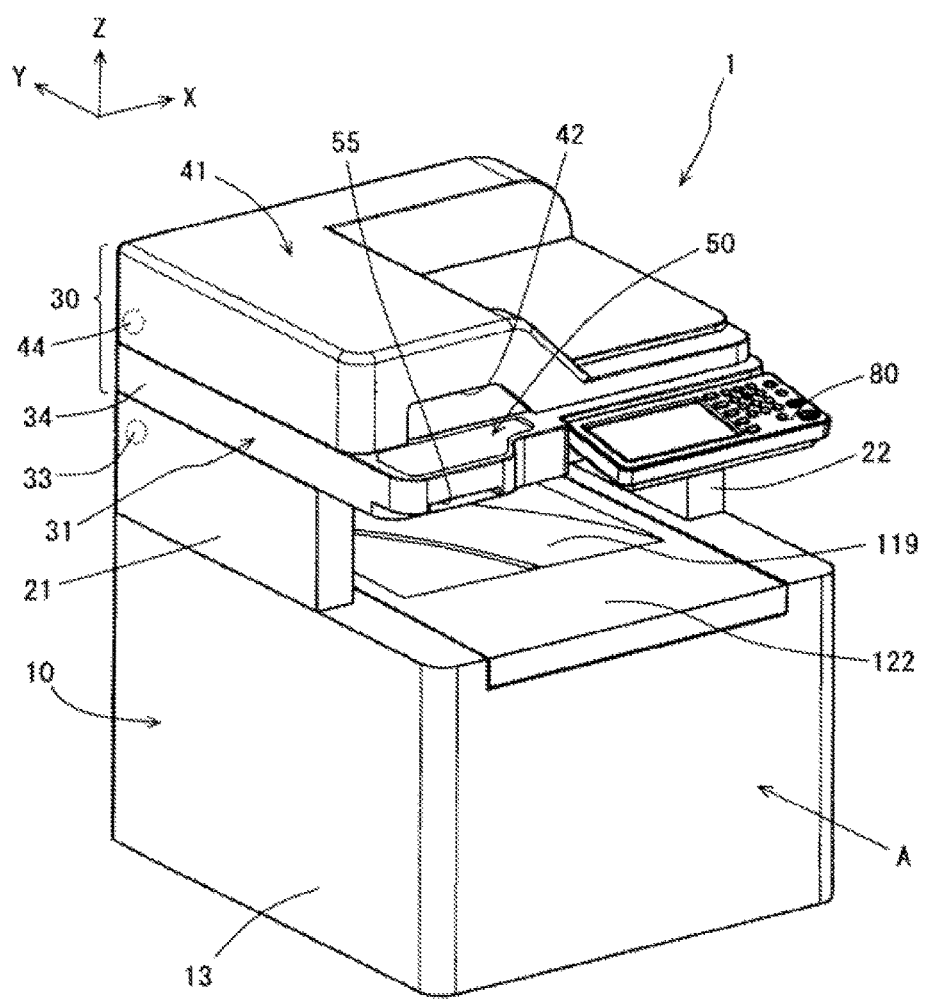
FIG. 1 is an external perspective view of a multifunction apparatus of Embodiment 1 based on the information processing device of this invention.
Figure 2:
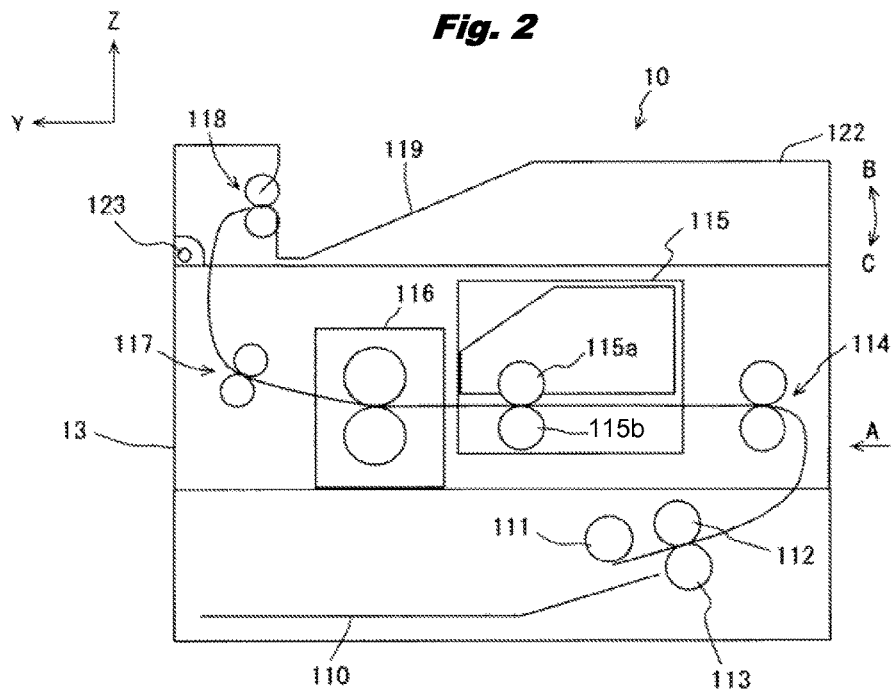
FIG. 2 is a schematic configuration diagram for explaining the main part configuration of an image printing part in Embodiment 1.

FIG. 1 is an external perspective view of a multifunction apparatus 1 of Embodiment 1 based on the information processing device of this invention, and FIG. 2 is a schematic configuration diagram for explaining the main part configuration of an image printing part 10. Besides, the up, down, right, left, front, and rear directions of the multifunction apparatus 1 shown in FIG. 1 may be specified viewing the multifunction apparatus 1 from the front face (Arrow A direction) in some cases.

As shown in FIG. 1, the multifunction apparatus 1 as being an information processing device and an image forming apparatus is provided with an image printing part 10 disposed in the lower part and an image reading part 30 disposed above it via a pair of left stay 21 and right stay 22.

As shown in FIG. 2, a medium loading platform 110, a pickup roller 111, a sheet feeding roller 112, a separation roller 113, a pair of carrying rollers 114 and 117, an image forming part 115, an image fuser 116, a pair of ejection rollers 118, and an ejected sheet stacking part 119 are arranged in the image printing part 10.

Recording sheets as a recording medium are piled on the medium loading platform 110, the pickup roller 111 sequentially ejects the top sheet of the recording sheets piled on the medium loading platform 110 toward the downstream side of a carrying path. The sheet feeding roller 112 and the separation roller 113 collaborate to handle and carry each piece of the recording sheets ejected by the pickup roller 111 from the medium loading platform 110 and carry it toward the downstream side along the sheet carrying path without having multiple sheets overlap one another.

The image forming part 115 as an image former employs a transfer roller 115b to transfer a toner image formed on a photosensitive drum 115a based on print data to the recording sheet carried further toward the downstream side by the pair of carrying roller 114, and carries the transferred recording sheet to the image fuser 116.

The image fuser 116 fuses the toner image transferred to the recording sheet carried in and ejects it toward the downstream side of the carrying direction, a pair of the carrying roller 117 carries the fused recording sheet sent from the image fuser 116 along the ejection carrying path to the pair of ejection rollers 118, and the pair of ejection rollers 118 eject the printing-processed recording sheet to the ejected sheet stacking part 119. Therefore, the recording sheets sequentially printed by the processing are stacked on the ejected sheet stacking part 119.

A stacker cover 122 of the image printing part 10 is provided with the pair of ejection rollers 118 and the ejected sheet stacking part 119 and is rotatably held centering on a rotation shaft 123 by an outer casing 13. For example, opening this stacker cover 122 by rotating it in the Arrow B direction from its close position enables maintaining the image fuser 116 and the image forming part 115.

The image printing part 10, for example, prints the image information read in an image reading part 30 on the recording sheet and ejects it onto the ejected sheet stacking part 119 of the stacker cover 122. As shown in FIG. 1, the left stay 21 and the right stay 22 are arranged opposing each other in parallel along the left and right sides across the stacker cover 122 on the upper portion of the outer casing 13 of the image printing part 10.

The image reading part 30 is provided with a flatbed unit 31 and an automatic document feeder (hereafter called ADF unit) 41 rotatably held by the flatbed unit 31 and is rotatably held by the left and right stays 21 and 22.

Besides, the image printing part 10, the left stay 21, and the right stay 22 correspond to the first unit, and the image reading part 30 corresponds to the second unit.

Figure 3:
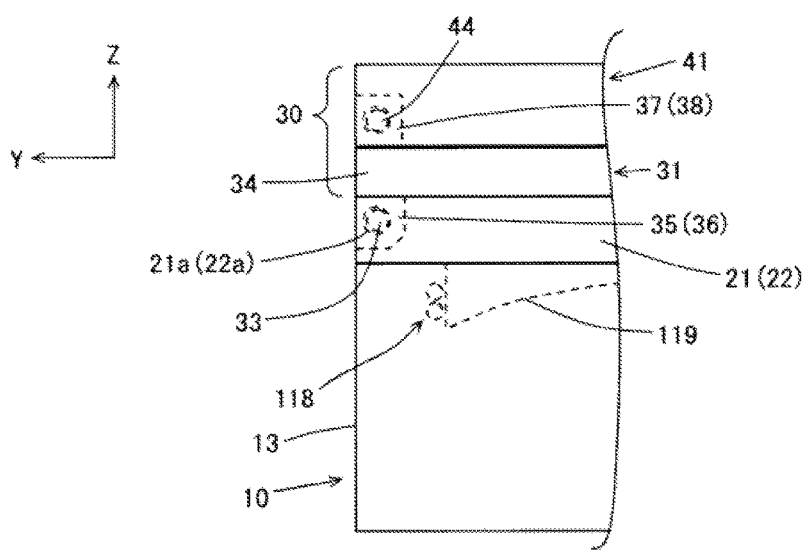
FIG. 3 is a main part configuration diagram viewing the combining portion of a multifunction apparatus in Embodiment 1 from the left side.

FIG. 3 is a main part configuration diagram viewing the combining portion of the multifunction apparatus 1 from the left side.

As shown in FIG. 3, a shaft holder 35 hanging down against the inner wall of the left stay 21 is formed in the vicinity of the rear end of a frame 34 of the flatbed unit 31. This shaft holder 35 holds a first rotation shaft 33 as the first rotation shaft extending from side to side, and on the inner wall of the left stay 21, a left shaft hole 21a is formed, which rotatably holds the left side tip of the first rotation shaft 33 fitted in. The frame 34 also has a shaft holder 36 hanging down against the inner wall of the right stay 22 in the same way. This shaft holder 36 holds the first rotation shaft 33 extending from side to side, and on the inner wall of the right stay 22, a right shaft hole 22a is formed, which rotatably holds the right side tip of the first rotation shaft 33 fitted in.

Therefore, the image reading part 30 can rotate centering on the first rotation shaft 33 with the flatbed unit 31 and the ADF unit 41 in one unit. FIGS. 1 and 3 show a state that this image reading part 30 is at its close position the frame 34 of its flatbed unit 31 is placed on the left and right stays 21 and 22 and extends along the length direction of the left and right stays 21 and 22.

Besides, X, Y, and Z axes in FIG. 1 are defined so that X axis is in the direction where the first rotation shaft 33 extends, Y axis is in the direction where the left and right stays 21 and 22 extend, and Z axis is in the direction perpendicular to both of these axes. Also, when X, Y, and Z axes are shown in other figures, those axes indicate the same directions. In other words, XYZ axes in each figure indicate the disposing directions when configuring the multifunction apparatus 1 shown in FIG. 1. Here, it is also supposed that Z axis is disposed to become approximately the vertical direction.

Also, as shown in FIG. 3, the ADF unit 41 as a rotating part is rotatably held by a pair of hinge units 37 (38) disposed so as to protrude from the left and right ends (both ends in the X-axis direction) of the rear upper face of the frame 34 of the flatbed unit 31 as a base part. This ADF rotation shaft 44 as the third rotation shaft extends in parallel (X-axis direction) with the first rotation shaft 33 positioned below it.

Therefore, the ADF unit 41 can rotate centering on the ADF rotation shaft 44 relative to the flatbed unit 31. FIGS. 1 and 3 show a state that this ADF unit 4 is in its close position and its bottom face is placed on the frame 34 of the flatbed unit 31. Therefore, the ADF unit 41 has a handle part 42 formed for its user to lift it up by hooking his fingers when opening the ADF unit 41.

Figure 4:
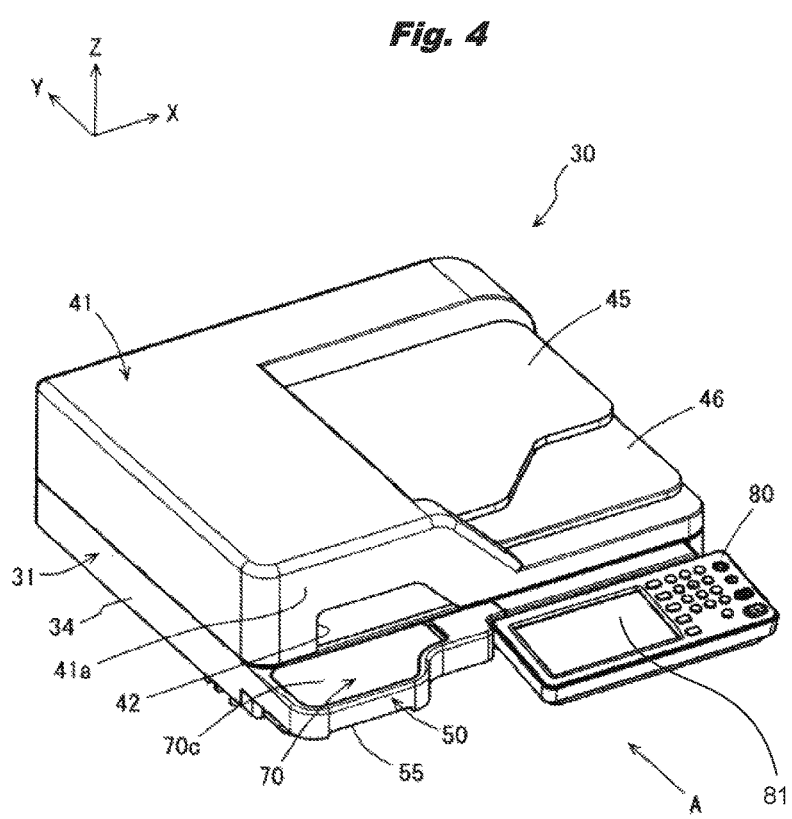
FIG. 4 is an external perspective view of an image reading part in Embodiment 1.
Figure 5:
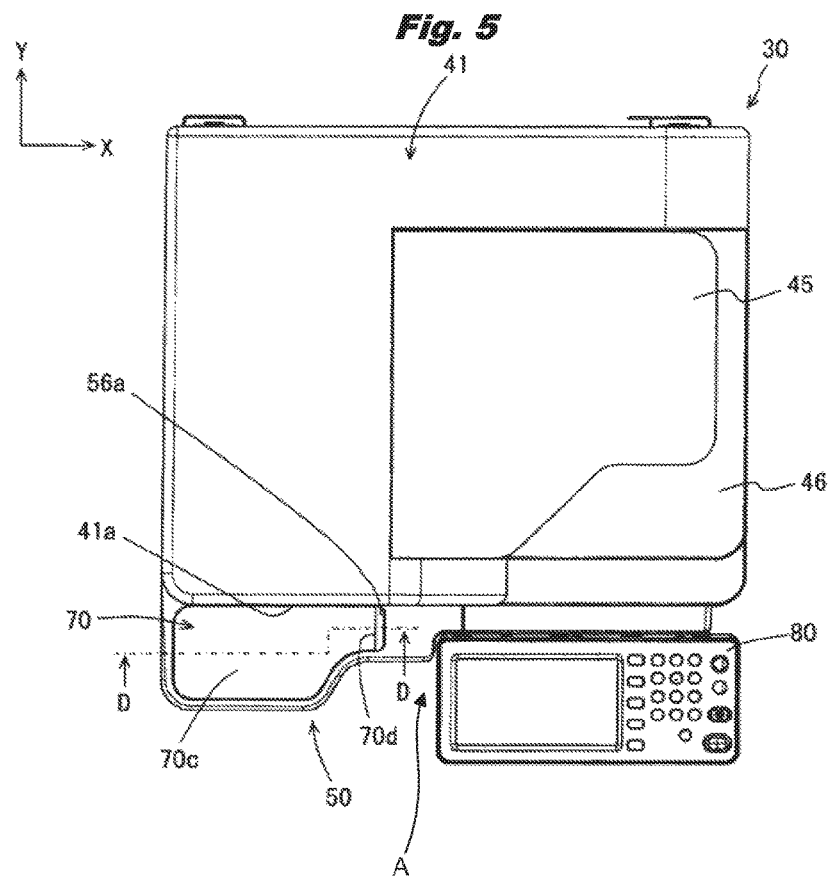
FIG. 5 is a plan view of an image reading part in Embodiment 1.
Figure 6:
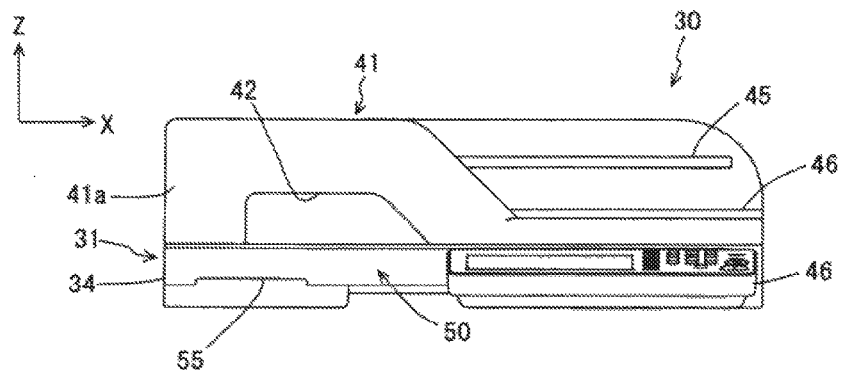
FIG. 6 is a front view of an image reading part in Embodiment 1.

FIG. 4 is an external perspective view of the image reading part 30, FIG. 5 is its plan view, and FIG. 6 is its front view.

As shown in these figures, the ADF unit 41 is provided with a document tray 45 where documents to be read are placed, and below the unit tray 45 an ejection tray 46 where read documents are placed, and the frame 34 of the flatbed unit 31 has an operation panel 80 as an input part on the right side and an IC card reader containing part 50 (an authenticator container) as a wireless reading unit containing part which contains an IC card reader 85 on the left side next to the operation panel 80 in the front part of the image reading part 30. The operation panel 80 is provided with a display part 81 to display various kinds of settings of image processing conditions and the status of the apparatus for example and an operation part for inputting commands to the apparatus. Here, the direction (Arrow A direction) facing the operation panel 80 arranged on the multifunction apparatus 1 is assumed to be the front of the multifunction apparatus 1.

Figure 9:
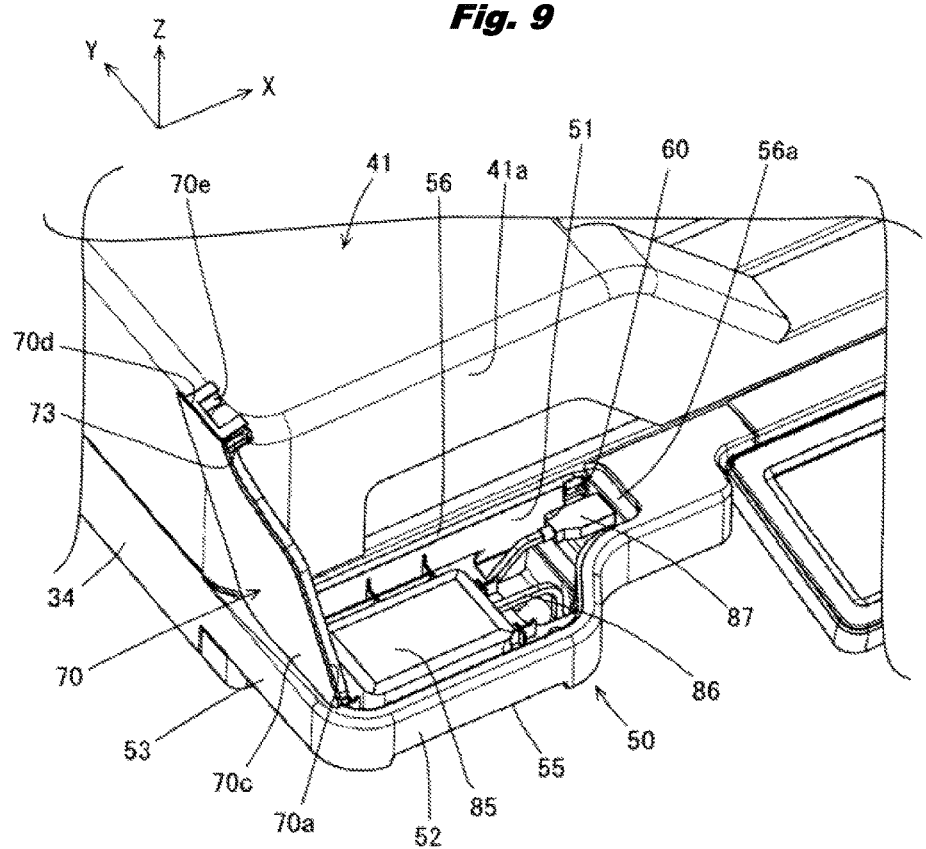
FIG. 9 is an external perspective view of an IC card reader containing part with an open/close lid open and its surroundings in Embodiment 1.

FIG. 7 is a plan view of the IC card reader containing part 50 in a state that the open/close lid 70 is taken out, FIG. 8 is the D-D cross-sectional view of the IC card reader containing part 50 shown in FIG. 5, and FIG. 9 is an external perspective view of the IC card reader containing part 50 and its surroundings in a state that the open/close lid 70 is opened.

As shown in these figures, the IC card reader containing part 50 is installed in a place where the frame 34 protrudes next to the operation panel 80 in a forward direction of the front face 41a of the ADF unit 41 on the left side of the front side of the image reading part 30 here and is provided with a containing recess 51 and an open/close lid 70. The containing recess 51 contains the IC card reader 85 as both a wireless reading unit and an authentication unit (an authenticator). The open/close lid 70 opens or closes the upper portion opening of the containing recess 51. Here, the open/close lid 70 is formed of polycarbonate, ABS resin, etc. so that radio wave of the IC card reader 85 is not shielded.

The containing recess 51 is surrounded with a front frame part 52, a left frame part 53, a right frame part 54, etc., a handle part 55 as a grasping part (a handle) is formed below the front frame part 52 for its user to lift it up by hooking his fingers when opening upward the image reading part 30 rotatable centering on the first rotation shaft 33 (FIG. 1). In the specification, the grasping part means various structures designed to assist the user to open or close the image reading part 30 (or the second unit). The handle part 55 on which the user easily places its fingers is one example. A bar shape that the user easily grips is also practical. In the embodiment, the grasping part is formed at a part of the wireless reading unit containing part. On the other hand, the wireless reading unit containing part may be formed at a part of the grasping part. The wireless reading unit containing part can be formed in the grasping part, functioning as the grasping part. A rotation shaft part 57 as the second rotation shaft for supporting the open/close lid rotatably is formed in the central portion of the upper portion of the inner wall of the left frame part 53 having a direction (Y-axis direction) perpendicular to the first rotation shaft 33 as its shaft direction. Here, the containing recess 51, the front frame part 52, the left frame part 53, and the right frame part 54 correspond to the containing part.

The open/close lid 70 has an external shape to fit in a placing groove 56 formed shallow at the edge surrounding the opening of the containing recess 51 and allow an edge part 70a to be placed in this placing groove 56 and is provided with a bearing part 71 (FIG. 8) having a semicircular cross section in a position opposing the rotation shaft part 57 of the containing recess 51.

Figure 10A:
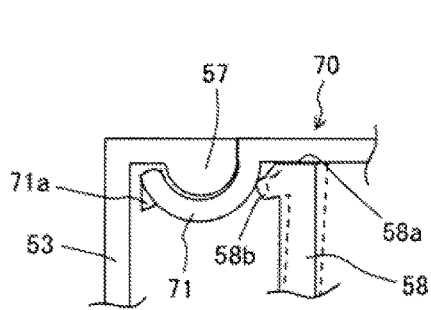
FIGS. 10A-B are partial enlarged views showing the configuration of a rotation shaft, a bearing of an open/close lid, and a pressing member formed in their vicinity of the left frame in Embodiment 1, where
Figure 10B:
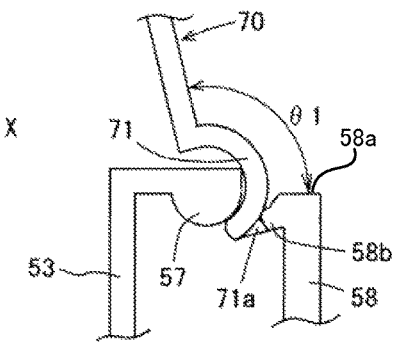

FIGS. 10A-B are partial enlarged configuration diagrams showing the configuration of a rotation shaft part 57 of the left frame part 53, the bearing part 71 of the open/close lid 70, and a pressing member 58 formed in the vicinity. The open/close lid 70 is detachable from the containing recess 51, and as shown in FIG. 10A, is attached by pushing a lock part 71a, which is formed on the tip portion of the bearing part 71 while bending the pressing member 58 as shown in a broken line in the figure, into a space that is formed between the rotation shaft part 57 and the pressing member 58 which is in the vicinity, has elasticity, and stands upright from the bottom of the containing recess 51.

FIG. 10A shows a state that the open/close lid 70 is at its close position and that the containing recess 51 is closed. At this time, the pressing member 58 supports the bottom face of the open/close lid 70 with a placing surface 58a formed at the tip portion, and biases the bearing part 71 of the open/close lid 70 to the rotation shaft part 57 formed on the left frame part 53 with a protrusion 58b. By this it becomes possible for the open/close lid 70 to rotate toward its open position centering on the rotating shaft part 57.

FIG. 10B shows a state that the open/close lid 70 has rotated to the open position and is open as shown in FIG. 9. At this time, the lock part 71a of the bearing part 71 of the open/close lid 70 contacts with the protrusion 58b of the pressing member 58, restricts the rotation of the open/close lid 70 which tries to open further by its own weight, and maintains the open/close lid 70 at this open position. Besides, although the open angle θ1 of the open/close lid 70 at this time was configured to be about 105 degrees, it should preferably be set to 95-120 degrees.

The open/close lid 70 has its front side cut in an arc shape and is formed in a tapered shape in the vicinity of the end part on the opposite side (right side) of the side (left side) where the bearing part 71 is formed, and a pair of latches 73 (73) extending in the direction of separating from the surface are formed on both sides (only one is shown in FIG. 9) of its tip portion. When the open/close lid 70 is at its close position, the lock projections 60 (60) are disposed (only one is shown in FIG. 9) in positions respectively opposing the pair of latches 73 (73) in the containing recess 51, which smoothly fixes the open/close lid 70 to its close position.

Figure 11A:
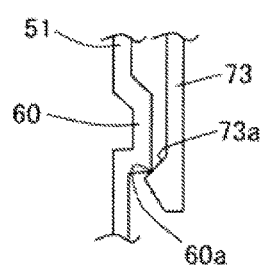
FIGS. 11A-C are operation explanatory diagrams for explaining the engaging behavior of a lock projection formed on the containing recess and a latch formed on the opposing open/close lid in Embodiment 1.
Figure 11B:
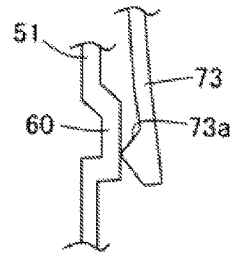
Figure 11C:
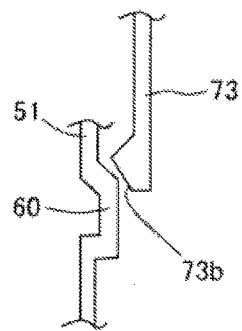

FIGS. 11A-C are operation explanatory diagrams for explaining the engaging behavior between the lock projection 60 formed in the containing recess 51 and the latch 73 which opposes to the lock projection 60, formed on the open/close lid 70.

FIG. 11A shows a state that the open/close lid 70 is at its close position and closed the containing recess 51. At this time, a first slope surface 73a that forms a protrusion and is formed on the tip portion of this latch 73 having elasticity contacts with a contact part 60a corresponding to the corner part of the lock projection 60 at a specific angle (here, the slope angle θ2 of the first slope surface 73a relative to the vertical direction is set to about 45 degrees), which restricts the upward movement of the latch 73 accompanying the rotation of the open/close lid 70 toward the open direction. Besides, the slope angle θ2 should preferably be set to 25-70 degrees.

As described later, if a force stronger than the specified one is applied toward the opening direction to the open/close lid 70 in this state, by the latch 73 moving upwards while bending, the restriction is released as shown in FIG. 11B, and the latch 73 and the lock projection 60 come into a separated state as shown in FIG. 11C.

On the other hand, when rotating the open/close lid 70 from its open position to its close position, as shown in FIG. 11C, a second slope surface 73b of a protrusion formed on the tip portion of the latch 73 contacts with the lock projection 60 and moves downwards while bending as shown in FIG. 11B. The first slope surface 73a of the latch 73 contacts with the contact part 60a of the lock projection 60 and becomes locked to the close position in the end as shown in FIG. 11A.

Also, the depth of the placing groove 56 is considered so that when the open/close lid 70 is locked to its close position, it is placed with the edge portion 70a contained in the placing groove 56, an IC card placing surface 70c which is its upper face as an authentication surface described later becomes flush with the upper face of the IC card reader containing part 50 (which is also the upper face of the frame 34 of the flatbed unit 31 here) as described earlier.

A handle part 70d formed thinner than the depth H of the placing groove 56 is formed on the tip portion of the open/close lid 70, and a handle space 56a is formed on the location opposing this handle part 70d of the placing groove 56 so that the operator can hook his fingers with the handle part 70d. Also, a cutout portion 70e where the operator's fingers can be inserted is formed in the vicinity of the handle part 70d so that grasping at the time of opening or closing can be securely performed.

As stated above, because the open/close lid 70 rotates centering on the rotation shaft part 57 disposed in the perpendicular direction to the ADF rotation shaft 44 which is the rotation shaft of the ADF unit 41, even when it is in an open state at the open position as shown in FIG. 9, it will not obstruct rotation of the ADF unit 41.

A placing floor 62 where the IC card reader 85 is placed is formed in the containing recess 51 which contains the IC card reader 85, and a cable storage space 66 (FIG. 8) is installed in the lower portion of the placing floor 62. On the placing floor 62 multiple ribs 63 (FIG. 7) are formed in the front, rear, left, and right of the IC card reader 85 placed, and these ribs 63 determines the position of the IC card reader 85 placed on the placing floor 62.

The IC card reader 85 has a rectangular parallelepiped shape which is a thick plate here, a cable 86 for transmitting/receiving read data and various kinds of data is connected to one end of the longitudinal direction, and a connector 87 is arranged at the tip of the cable 86. The IC card reader 85 is placed on the placing floor 62 of the containing recess 51 so that its longitudinal face is oriented to the front and that the one end connected to the cable 86 is oriented to the opposite side of the rotation shaft part 57 of the open/close lid 70. Besides, the IC card reader 85 here is a device which wirelessly reads an IC chip built in an IC card, etc. Here, although an IC card was adopted as an example, it may also be a portable terminal having an IC chip built in.

Figure 12:
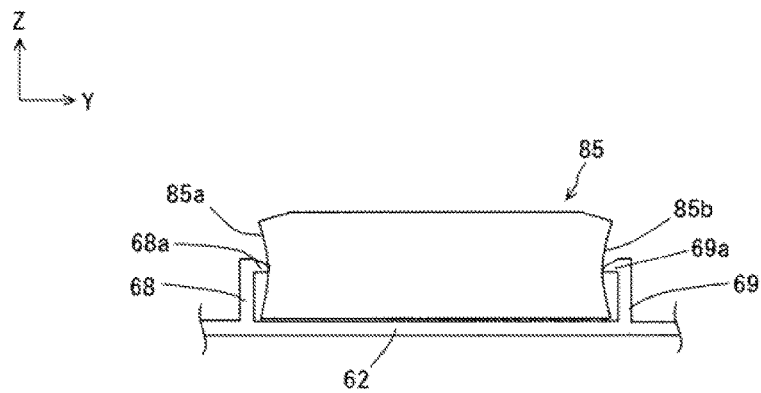
FIG. 12 is a main part configuration diagram viewing an IC card reader disposed on a placing floor along with a latch from the right side (X-axis positive side).

FIG. 12 is a main part configuration diagram at the E-E cross section viewing the IC card reader 85 positioned on the placing floor 62 in this manner from the right side (X-axis plus side) together with latches 68 and 69.

As shown in the figure, the IC card reader 85 has a pair of opposing longitudinal faces 85*a* and 85*b* formed with approximately arc shape cross sections in the directions approaching each other, and in the most recessed position a pair of latches 68 and 69 planted on the placing floor 62 are formed so that projections 68*a* and 69*a* of the latches 68 and 69 contact with each other. The latches 68 and 69 have elasticity and fix the IC card reader 85 by restricting its upward and downward movements by pressure-contacting it from both sides in a slightly warped state.

The cable 86 connected to the IC card reader positioned in this manner has its connector 87 inserted to a socket 67 as a connecting part disposed so that its receiving port is positioned on the inner wall portion of the right frame part 54 of the containing recess 51, and its excess length portion 86*a* is introduced to the lower part of the placing floor 62 from a cutout portion 64 as the opening of the placing floor 62 and is stored in the cable storage space 66. This socket 67 is electrically connected via a cable 67*a* to a control board which is not shown. Besides, a cutout portion 70*e* formed on the tip portion of the open/close lid 70 is for avoiding the connector 87 inserted to the socket 67 when closing the open/close lid 70.

Also, because the socket 67 is disposed so that its receiving port is positioned on the inner wall portion of the right frame part 54 in the opposite side of the left frame 53 of the containing recess 51 where the rotation shaft part 57 of the open/closed lid 70 is formed, as shown in FIG. 9, the connector 87 can be inserted to the socket 67 without being obstructed by the open/close lid 70 at its open position.

Also, because the rotation shaft part 57 is arranged on a side of the containing recess 51 separated from the operation panel 80, as shown in FIG. 9, operation or checking the display of the operation panel 80 by the user will never be obstructed by the open/close lid 70 at its open position.

Functions of individual parts of the multifunction apparatus 1 in the above configuration will be further explained.

When the stacker cover 122 is opened for the maintenance of the image printing part 10, etc., first the image reading part 30 in the upper part is rotated centering on the first rotation shaft 33 from the close position to the open position. At this time, the operator hooks his fingers on the handle part 55 formed on the IC card reader containing part 50 for example and lifts the tip portion of the image reading part 30 upwards. At this time, when the image reading part 30 has rotated by about 60 degrees, its further rotation is restricted by a limiter which is not shown, and it is held at that rotation position (or the open position) by a locking mechanism which is not shown. By this, the operator can further open the stacker cover 122 and perform maintenance such as replacing consumables such as the image fuser 116.

On the other hand, in the image reading part 30 there are cases when a document to be read is placed on a specified position on the flatbed unit 31 and the document is read. In such a case, in the image reading part 30 at its close position as shown in FIG. 1, the ADF unit 41 is rotated relative to the flatbed unit 31 centering on the ADF rotation shaft 44 from the close position to the open position. At this time, the operator hooks his fingers on the handle part 42 formed on the front face 41*a* (FIG. 4) of the ADF unit 41 and lifts its tip portion upwards.

Next, the procedure for attaching the IC card reader 85 to the multifunction apparatus 1 will be explained.

The operator first hooks his fingers on the handle part 70*d* of the open/close lid 70 through the handle space 56*a* of the IC card reader containing part 50 and rotates it centering on the rotation shaft part 57 (FIGS. 10A and 10B) from its close position to its open position shown in FIG. 9. At this time, the open/close lid 70 has its rotation restricted and is held at a position where the open angle θ1 becomes about 105 degrees.

Next, the operator positions the prepared IC card reader 85 to a specified position guided by the multiple ribs 63 formed on the placing floor 62 of the containing recess 51 and presses it down with some pressing force for fixing it with the latches 68 and 69. By this, the IC card reader 85 has its upward movement restricted by the latches 68 and 69 pressing the most recessed position of the curved longitudinal faces 85*a* and 86*a* and is fixed in the upward, downward, leftward, and rightward directions.

Before this IC card reader attachment, the operator inserts the connector 87 to the socket 67 (FIG. 8) arranged in the IC card reader containing part 50 and stores the excess length portion in the cable storage space 66 formed in the lower portion of the placing floor 62. Afterwards, the open/close lid 70 is closed to the close position and fixed to the close position by engagement of the pair of latches 73 and the corresponding pair of lock projections 60 as explained with FIG. 11.

The operator placing an IC card on the IC card placing surface 70*c* corresponding to the upper surface of the closed open/close lid 70 and has data of the placed IC card read by the IC card reader 85 attached to the IC card reader containing part 50 to perform IC card authentication for example.

Besides, although the IC card reader containing part 50 was formed as a part of the frame 34 in the multifunction apparatus 1 of this embodiment, this invention is not limited to this, but it may be configured as a unit and attached to the frame 34.

Also, although the ADF rotation shaft 44 which is the rotation shaft of the ADF unit 41 was disposed in this embodiment so that the shaft direction becomes parallel to the axial direction of the first rotation shaft 33 which is the rotation shaft of the image reading part 30, this invention is not limited to this, but it may be disposed on the right side of the apparatus in a direction perpendicular to the axial direction of the first rotation shaft 33 so that the ADF unit 41 rotates centering on this ADF rotation shaft.

Also, although the IC card reader containing part 50 was disposed on the left side of the operation panel 80 in this embodiment, this invention is not limited to this but may have the left and right sides disposed reversely.

Also, although a noncontact type IC card reader 85 of which reads in data of an IC card was adopted as the wireless reading unit in this embodiment, this invention is not limited to this but may adopt a contact type and also a magnet card reader which reads data of a magnetic card.

Further, although a print device with a monochromatic direct transfer system was shown in the image printing part 10, this invention is not limited to this but can take various modes such as a print device for color printing provided with an image forming part for multiple colors or a print device with an intermediate transfer system for example.

As stated above, according to the multifunction apparatus 1 of this embodiment, because the IC card reader containing part 50 is disposed next to the operation panel 80 on the front side of the apparatus, the IC card reader 85 can be mounted without expanding the installation space of the apparatus or damaging the external appearance of the apparatus.

Also, because the IC card reader containing part 50 is disposed on the front side of the apparatus separated from the first rotation shaft 33 disposed in the rear part of the apparatus, the handle part 55 for opening/closing the image reading part 30 can be installed in the IC card reader containing part 50, allowing a layout without a waste. Further, because the handle part 55 is installed in a position opposing the IC card placing surface 70c, when the image reading part 30 is rotated, the user trying to hold the handle part 55 sees the IC card placing surface 70c and thus can notice if he forgot taking the IC card out.

Embodiment 2

Figure 13:
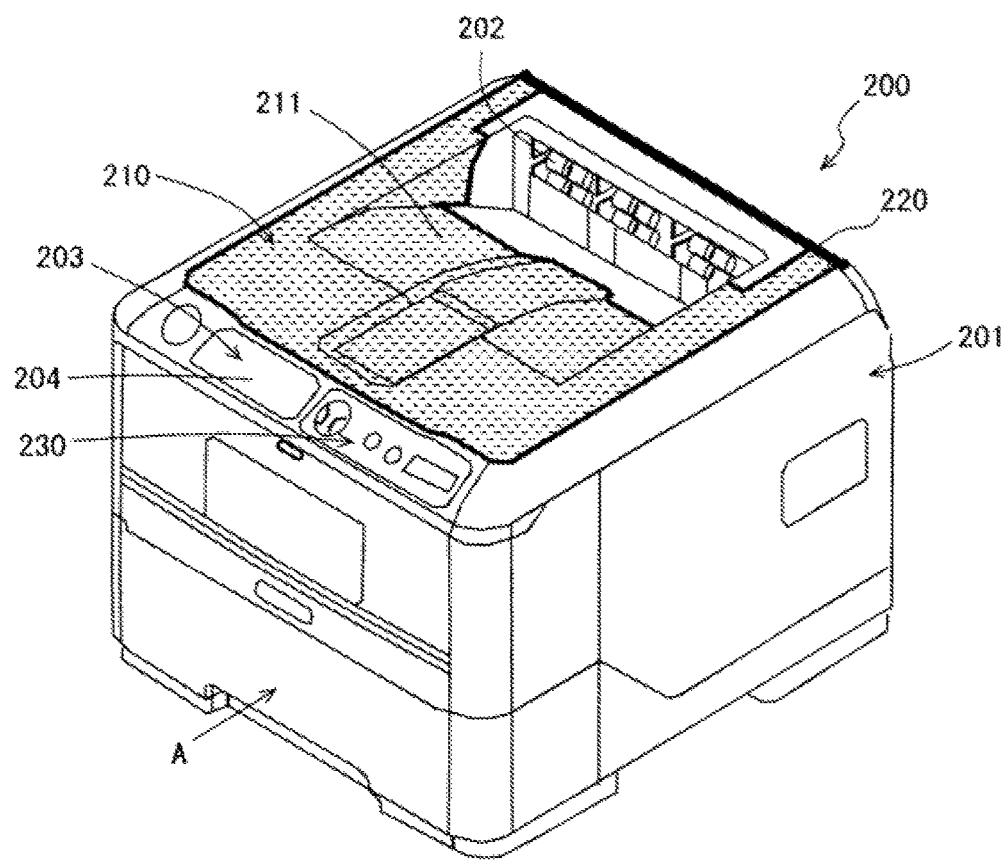
FIG. 13 is an external perspective view of a printer in Embodiment 2 based on the information processing device of this invention seen obliquely from above.

FIG. 13 is an external perspective view of a printer 200 of Embodiment 2 based on the information processing device of this invention seen from obliquely above. Besides, the up, down, left, and right directions of the printer 200 may specified by viewing the printer 200 shown in FIG. 13 from the front face (Arrow A direction) in some cases.

The printer 200 as an image forming apparatus which is an information processing device is provided with a printer main body 201 as the first unit and a stacker cover 210 (shaded part) as the second unit rotatably held by the printer main body 201 centering on a rotation shaft 220 as the first rotation shaft extending from side to side in the vicinity of the rear end of the upper part of the printer main body 201. The printer main body 201 has an IC card reader containing part 203 as the wireless reading unit containing part on the left side and an operation panel 230 as the input part on the right side disposed next to each other in the more front side than the stacker cover 210.

The internal configuration of the printer main body 201 is the same as the internal configuration of the image printing part 10 explained in FIG. 2 of Embodiment 1. In other words, recording sheets with printing finished internally are sequentially ejected by a pair of ejection rollers 202 (118 in FIG. 2) and stacked on an ejected sheet stacking part 211 (119 in FIG. 2) of the stacker cover 210 (122 in FIG. 2).

Also, the main configuration of the IC card reader containing part 203 having an open/close lid 204 is the same as the IC card reader containing part 50 (FIG. 4 for example) having the open/close lid 70 explained in Embodiment 1. In other words, the IC card reader containing part 203 is provided with the placing floor 62, the rib 63, the latch 68, the rotation shaft part 57, the socket 67, the open/close lid 70 (204 in this embodiment), etc. shown in FIGS. 7 and 8 in the same positional relationship and contains the IC card reader 85, where only partial shapes of the open/close lid 70, the placing groove 56, etc. are different.

Besides, although the relationship among the printer main body 201 as the first unit, the stacker cover 210 as the second unit, the IC card reader containing part 203 as the wireless reading unit containing part, and the operation panel 230 as the input part was explained with the printer 200 which is an image forming apparatus as an information processing device as an example in this embodiment, this invention is not limited to this but may take various modes wherein a scanner having the same configuration with the image reading part 30 shown in Embodiment 1 may be assumed, and a flatbed unit as the first unit and an ADF unit as the second unit may be assumed.

As stated above, according to the printer 200 of this embodiment, because the IC card reader containing part 203 is disposed next to the operation panel 230 on the front side of the apparatus, an IC card reader can be mounted without expanding the installation space of the apparatus or damaging the external appearance of the apparatus. Also, because the open/close lid 204 rotates centering on the rotation shaft part disposed in a direction perpendicular to the rotation shaft 220 of the stacker cover 210, it will not obstruct the rotation of the stacker cover 210 even in its open state.

In this embodiment, explanations were given using a multifunction apparatus and a printer which are image forming apparatuses as the information processing device, this invention is applicable to copiers, facsimile machines, scanners, etc.

What is claimed is:

1. An image forming apparatus, comprising:
   a body of the image forming apparatus that includes an image forming part to form an image on a medium,
   a cover that is provided on the body and includes a stacker on which the medium, which is ejected outside the image forming apparatus by an ejection roller in an ejection direction after the image is formed, is stacked, wherein
   the body includes
      an operation panel that accepts an input by a user,
      an authenticator container that contains an authenticator for a user authentication, the authenticator being different from the operation panel and the authenticator container being separated from the operation panel,
   the authenticator container and the operation panel are
      disposed downstream of the stacker in the ejection direction, and along one side among four sides of the image forming apparatus seen from above the image forming apparatus in a vertical direction, and
      adjacently arranged along a lateral direction perpendicular to the ejection direction and the vertical direction, and
   the stacker is positioned between the ejection roller and the one side of the image forming apparatus in the ejection direction, seen from above the image forming apparatus in the vertical direction.

2. The image forming apparatus according to claim 1, wherein
   the authenticator is attached within the authenticator container from above.

3. The image forming apparatus according to claim 1, wherein
   the authenticator container includes a socket; and
   the authenticator includes a connector that is inserted into the socket in the lateral direction.

4. The image forming apparatus according to claim 3, wherein
   the connector is provided in an operation panel side.

5. The image forming apparatus according to claim 1, wherein
   the authenticator container includes a recess that includes a placing surface;
   the authenticator container includes a latch that projects upward from the placing surface and holds the authenticator.

6. The image forming apparatus according to claim 5, wherein
   the authenticator includes a cable;
   the authenticator container includes a space containing the cable;
   the space is formed under the placing surface.

7. The image forming apparatus according to claim 1, wherein
   the authenticator is an IC card reader.

8. The image forming apparatus according to claim 1, wherein
   the authenticator container includes a container recess configured to contain the authenticator, and
a lid that is openable and closable, wherein the lid covers the containing recess when the lid is closed.

9. The image forming apparatus according to claim 1, wherein
the stacker and the section of the operation panel and the authenticator container are arranged side by side in the ejection direction, and
a boundary of the stacker and the section of the operation panel and the authenticator container is continuously formed.

10. The image forming apparatus according to claim 1, wherein
the stacker has a width that is determined in the lateral direction,
seen in the ejection direction, the operation panel and the authenticator container are both positioned within the width of the stacker.

11. The image forming apparatus according to claim 1, wherein
the authenticator is an IC card reader, and has a reading surface at which the IC card is read, and
the reading surface is flush with the operation panel.

12. The image forming apparatus according to claim 11, wherein
the reading surface is formed on an open/close lid that is pivotable between an open position and a close position.

13. The image forming apparatus according to claim 1, wherein
the stacker, the ejection roller and the section are placed at the same height in the vertical direction.

14. The image forming apparatus according to claim 1, wherein
the operation panel has an upper surface through which the input is accepted,
the authenticator container has an upper surface through which the authenticator, which is contained in the authenticator container, reads data for the user authentication, and
the upper surface of the operation panel is flush with the upper surface of the authenticator container.

15. An information processing device, comprising:
a first body,
a second body that is disposed above the first body, the first body and the second body being accumulated in a vertical direction, wherein
the second body includes
an operation panel that accepts an input by a user, and
an authenticator container that contains an authenticator for a user authentication, the authenticator being different from the operation panel and the authenticator container being separated from the operation panel,
the operation panel and the authenticator container are adjacently arranged along one side among four sides of the second body seen from above the information processing device in the vertical direction,
the operation panel is disposed along the one side so as to project in a first direction that is perpendicular to the vertical direction,
the authenticator container is disposed and fixed on the one side so as to project in the first direction,
an interspace, which is physically empty, exists between the authenticator container and the operation panel in a second direction that is perpendicular to both of the first direction and the vertical direction,
the authenticator container has a grasping part that is provided on an opposite side from a reading surface for an IC card,
the second body is moveable between a first position and a second position with respect to the first body, and
the grasping part is grasped by the user when the second body moves from the first position to the second position.

16. The information processing device according to claim 15, wherein the information processing device is an image forming apparatus.

17. The information processing device according to claim 15, wherein
the second body includes
a flatbed that includes a first frame;
an ADF that is rotatable relative to the flatbed;
a second frame that forms the authenticator container;
the first frame is integral with the second frame.

18. The information processing device according to claim 15, wherein
the second body includes an ADF,
the authenticator is disposed outside a region where the ADF is disposed.

19. The image forming apparatus according to claim 15, wherein
the authenticator is attached within the authenticator container from above.

20. The information processing device according to claim 15, wherein
the first body includes
an image former that forms an image on a medium;
a stacker on which the medium is ejected;
the authenticator is disposed above the stacker.

21. The information processing device according to claim 5, wherein
the operation panel is provided along with the authenticator container in the first direction;
the authenticator container includes a socket; and
the authenticator includes a connector that is inserted into the socket in the first direction.

22. The information processing device according to claim 21, wherein the connector is provided in an operation panel side.

23. The image forming apparatus according to claim 15, wherein
the authenticator container includes a recess that includes a placing surface;
the authenticator container includes a latch that projects upward from the placing surface and holds the authenticator.

24. The information processing device according to claim 23, wherein
the authenticator includes a cable;
the authenticator container includes a space containing the cable;
the space is formed under the placing surface.

25. The information processing device according to claim 15, wherein
the authenticator is an IC card reader that reads the IC card.

26. The information processing device according to claim 15, wherein
The information processing device is an image forming apparatus.

27. The image forming apparatus according to claim 15, wherein
the operation panel includes a display.

28. The image forming apparatus according to claim 15, wherein
the authenticator container includes
a container recess configured to contain the authenticator, and
a lid that is openable and closable, wherein the lid covers the container recess when the lid is closed.

29. The information processing device according to claim 28, wherein
the second body is disposed to be rotatable relative to the first body;
a rotational direction of the second body is approximately perpendicular to a rotational axial direction of the lid.

30. The information processing device according to claim 28, wherein
the lid is held in the opened state by the second body.

31. The image forming apparatus according to claim 28, wherein
the lid of the authenticator container is pivotable between an open position and a close position around a rotation shaft part,
the lid stays horizontally at the close position,
an angle formed between the open position and the close position is ranged from 95 degrees to 120 degrees seen in the first direction such that the lid at the open position is prevented from returning to the close position due to the gravity.

32. The image forming apparatus according to claim 31, wherein
defining the one side of the second body as a front side, the operation panel is positioned right and the authenticator container is positioned left, seen from the front side, and
the rotation shaft part extends in the first direction, and arranged such that the lid rotates in an anticlockwise direction when moving to the open position, seen from the front side.

33. The information processing device according to claim 32,
wherein when the lid is opened, the authenticator can be attached within the authenticator container,
wherein when the lid is closed, the authenticator cannot be attached within the authenticator container.

34. The information processing device according to claim 32, wherein
the second body includes
a flatbed, and
an ADF that is rotatable relative to the flatbed.

35. An image forming apparatus, comprising:
a body of the image forming apparatus that includes an image forming part to form an image on a medium,
a cover that is provided on the body and includes a stacker on which the medium, which is ejected outside the image forming apparatus by an ejection roller in an ejection direction after the image is formed, is stacked, wherein
the body includes
an operation panel that accepts an input by a user,
an authenticator container that contains an authenticator for a user authentication, the authenticator being different from the operation panel and the authenticator container being separated from the operation panel,
the authenticator container and the operation panel are disposed downstream of the stacker in the ejection direction, and along one side among four sides of the image forming apparatus seen from above the image forming apparatus in a vertical direction, and
adjacently arranged along a lateral direction perpendicular to the ejection direction and the vertical direction,
the stacker is positioned between the ejection roller and the one side of the image forming apparatus in the ejection direction,
the stacker and the section of the operation panel and the authenticator container are arranged side by side in the ejection direction, and
a boundary of the stacker and the section of the operation panel and the authenticator container is continuously formed.

36. The image forming apparatus according to claim 35, wherein
the authenticator container includes a socket; and
the authenticator includes a connector that is inserted into the socket in the lateral direction.

37. The image forming apparatus according to claim 36, wherein
the connector is provided in an operation panel side.

38. The image forming apparatus according to claim 35, wherein
the authenticator container includes a recess that includes a placing surface;
the authenticator container includes a latch that projects upward from the placing surface and holds the authenticator.

39. The image forming apparatus according to claim 35, wherein
the stacker has a width that is determined in the lateral direction,
seen in the ejection direction, the operation panel and the authenticator container are both positioned within the width of the stacker.

40. The image forming apparatus according to claim 35, wherein
the authenticator is an IC card reader, and has a reading surface at which the IC card is read, and
the reading surface is flush with the operation panel.

41. The image forming apparatus according to claim 40, wherein
the reading surface is formed on an open/close lid that is pivotable between an open position and a close position.

42. The image forming apparatus according to claim 35, wherein
the stacker, the ejection roller and the section are placed at the same height in the vertical direction.

* * * * *